United States Patent [19]

Akitomo et al.

[11] 4,323,309
[45] Apr. 6, 1982

[54] SPECTRO-PHOTOMETER WITH ARITHMETIC AND CONTROL UNIT

[75] Inventors: Nobuo Akitomo; Shigeo Tohyama, both of Katsuta, Japan

[73] Assignee: Hitachi, Ltd., Tokyo, Japan

[21] Appl. No.: 124,853

[22] Filed: Feb. 26, 1980

[30] Foreign Application Priority Data

Mar. 2, 1979 [JP] Japan .................................. 54/24956

[51] Int. Cl.³ ........................... G01J 3/02; G01J 3/42
[52] U.S. Cl. .................................... 356/319; 356/325; 364/498; 364/571
[58] Field of Search ............................. 356/319–325; 355/3 R, 14 C, 14 CU; 364/498, 571, 708, 710

[56] References Cited

U.S. PATENT DOCUMENTS 4,054,380  10/1977  Donohue et al. .............. 355/3 R X

FOREIGN PATENT DOCUMENTS 53-120582  10/1978  Japan .

OTHER PUBLICATIONS

Morgenthaler et al., *American Laboratory*, vol. 8, No. 8, Aug. 1976, pp. 37–45.

Primary Examiner—F. L. Evans
Attorney, Agent, or Firm—Craig and Antonelli

[57] ABSTRACT

A spectro-photometer having a calibration mechanism and a wavelength-range changeover mechanism is disclosed which is equipped with an operation panel for setting measuring frequencies and function modes, is controlled by a microcomputer to be subjected to the calibration and the changeover of wavelength range in a predetermined order, conducts a predetermined arithmetic operation on the basis of photometric values measured by the spectro-photometer, and further comprises two display elements mounted on the operation panel for performing the following display operation in accordance with a command from the microcomputer. That is, in the calibration period, a code showing that the spectro-photometer is now subjected to calibration, is displayed on one of the display elements, and the number of remaining check items is displayed on the other display element. While, in the wavelength-range changeover period, a code showing that the spectro-photometer is subjected to the wave-length changeover operation, is displayed on one display element, and a waiting time till the termination of wavelength-range changeover operation is displayed on the other display element.

12 Claims, 6 Drawing Figures

SPECTRO-PHOTOMETER WITH ARITHMETIC AND CONTROL UNIT

BACKGROUND OF THE INVENTION

The present invention relates to a spectro-photometer, and more particularly to a spectro-photometer which is equipped with a microcomputer for performing the arithmetic and control operation and can be used for both 2-wavelength spectro-photometry and 2-beam spectro-photometry.

Conventional spectro-photometers are usually provided with a calibration mechanism and a wavelength range changeover mechanism. A conventional spectro-photometer which employs a microcomputer to perform the calibrating operation, the wavelength-range changeover operation and the arithmetic operation on a photometric quantity obtained by the spectro-photometer and can be used for both 2-wavelength spectro-photometry and 2-beam spectro-photometry, is disclosed in, for example, a Japanese patent application entitled "Spectro-photometer" (Laid-open No. 120582/78).

In the conventional spectro-photometer of this kind, when it takes a few seconds to change over the wavelength range, an operator feels inconvenienced only a little. However, when the changeover of wavelength range requires several minutes, the operator will feel inconvenience in no little degree, since it is not clear how long the operator has to wait, or whether the suspension of operation in the spectro-photometer is caused by any trouble or changeover operation.

SUMMARY OF THE INVENTION

An object of the present invention is to provide a spectro-photometer which can display the operational state thereof and is equipped with an arithmetic and control unit.

Another object of the present invention is to provide a spectro-photometer which can display the operational state thereof in the calibration period and is equipped with an arithmetic and control unit.

A further object of the present invention is to provide a spectro-photometer which can display the operational state thereof in the wavelength-range changeover period and is equipped with an arithmetic and control unit.

In order to attain these and other objects, in a spectro-photometer according to the present invention, the reasons why the calibration or the changeover of wavelength range has not yet been completed, as well as the state of items left untreated in the calibration or wavelength-range changeover process, are displayed on display elements. In more detail, the above reasons indicate the fact that a specified command is not applied from the microcomputer to the spectro-photometer, and include, for example, such a case that the next step in the calibration process is not carried out due to any trouble in a detector. Further, the state of items left untreated includes the residual time and the number of remaining steps.

DESCRIPTION OF THE PREFERRED EMBODIMENTS

Figure 1:
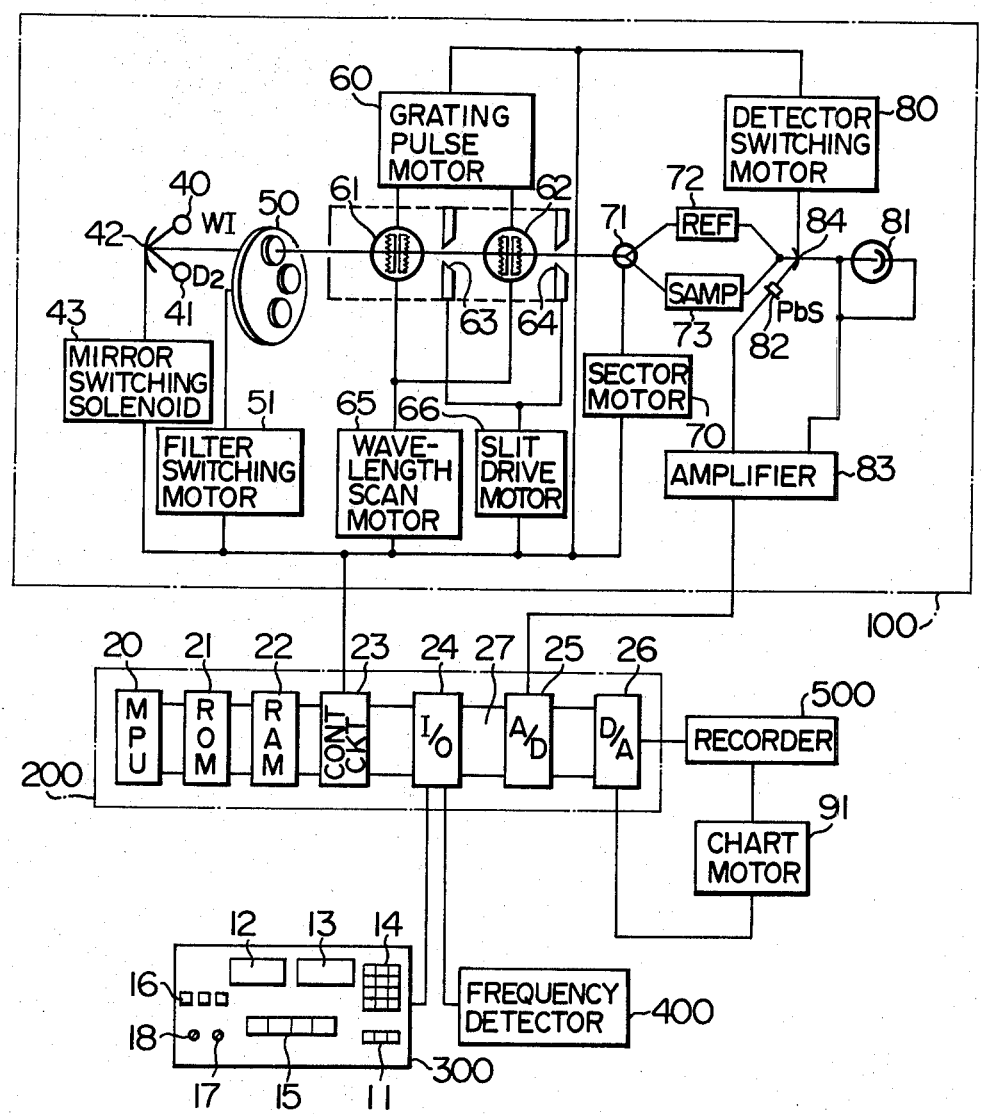
FIG. 1 shows a block diagram showing an embodiment of a spectro-photometer with an arithmetic and control unit according to the present invention.

Referring to FIG. 1, an embodiment of a spectro-photometer with an arithmetic and control unit according to the present invention includes a spectro-photometer 100, a microcomputer 200, an operation panel 300, a frequency detector 400, and a recorder 500. The spectro-photometer 100 is provided with a calibration mechanism, namely, a mechanism subjected to changeover or adjustment for the purpose of calibration, and a wavelength-range changeover mechanism, namely, a mechanism for switching the wavelength range. The mechanism subjected to changeover or adjustment for the calibration purpose, is made up of a light source mirror 42 for shifting a light source from a tungsten filament lamp WI 40 to a deuterium discharge tube $D_2$ 41, or vice versa, a filter 50, sine bar type gratings 61 and 62, and slits 63 and 64. As is shown in FIG. 1, the light source mirror, the filter, the gratings and the slits are driven by a mirror switching solenoid 43, a filter switching motor 51, a wavelength scan motor 65, and a slit drive motor 66, respectively.

In order to change the wavelength range from the near infrared region to the visible region, in addition to the changeover of the light source, the changeover between the gratings 61 and 62 and the changeover of a detector mirror 84 for selecting one of the optical paths directed respectively to a photomultiplier 81 and a PbS detector 82 are required. The above-mentioned changeover operations, as is shown in FIG. 1, are performed by a grating pulse motor 60 and a detector switching motor 80. Further, the changeover between an optical path passing through a reference cell 72 and another optical path passing through a sample cell 73 is performed by a sector mirror 71 which is driven by a sector motor 70 as soon as the power supply is turned on. The photometric values detected respectively by the photomultiplier 81 and the PbS detector 82 are amplified by an amplifier 83.

The microcomputer 200 operates the calibration mechanism of the spectro-photometer, performs the arithmetic and control operation for switching the wavelength range, and conducts an arithmetic processing on the basis of the photometric values detected by the detectors 81 and 82. The microcomputer 200 is made up of a microprocessing unit (hereinafter referred to as MPU) 20, a read only memory (ROM) 21, a random access memory (RAM) 22, a control circuit (CONT CKT) 23, an input/output port (I/O) 24, an analog-digital converter (A/D) 25, and a digital-analog converter (D/A) 26. The RAM 22 includes a resettable memory for conducting the event count, and the MPU 20 includes a resettable register for performing an arithmetic operation.

In the microcomputer 200 shown in FIG. 1, the MPU 20 fulfills various functions which are required to perform the above-mentioned arithmetic and control operation, in accordance with a program written in the ROM 21, sends data to the RAM 22 to temporarily store the data therein, and sends out and receives various signals necessary to perform the arithmetic and control operation. The CONT CKT 23 controls the spectro-photometer 100 on the basis of control signals which are obtained from the calculation in the MPU 20. The I/O 24 sends input information supplied from the operation panel 300 to the MPU 20, and sends the wavelength and the photometeric value to the operation panel 300 in accordance with a command from the MPU 20. Further, the I/O 24 sends input information supplied from the frequency detector 400 to the MPU 20. The A/D 25 takes in input formation from the amplifier 83, and the D/A 26 sends the photometric value to the recorder 500. The MPU 20, the ROM 21, the RAM 22, the CONT CKT 23, the I/O 24, the A/D 25 and the D/A 26 are connected with one another through a bus line 27.

The operation panel 300 is used to set photometric conditions. The setting of photometric conditions means herein the setting of measuring frequency and the setting of such a function mode as the 2-wavelength spectro-photometry or the 2-beam spectro-photomery. The operation panel 300 includes a key 15 for switching the function mode between the 2-wavelength spectro-photometry and the 2-beam spectro-photometry, display elements 12 and 13 for displaying the operational state of the spectro-photometer 100, numerical keys 14 for inputting numerical values which defines the wavelength scan and the slit width, operation keys 15 for sending the numerical value set by the keys 14 to the RAM 22, pilot lamps 16, and knobs 17 and 18 for adjusting the zero point and the full scale position of the recorder 500. The frequency detector 400 detects the frequency of supply voltage, since the frequency calculation is conducted in determining an integration time in the A/D 25 and in correcting data in the MPU 20. Further, the recorder 500 is driven by a chart motor 91.

Figure 2:
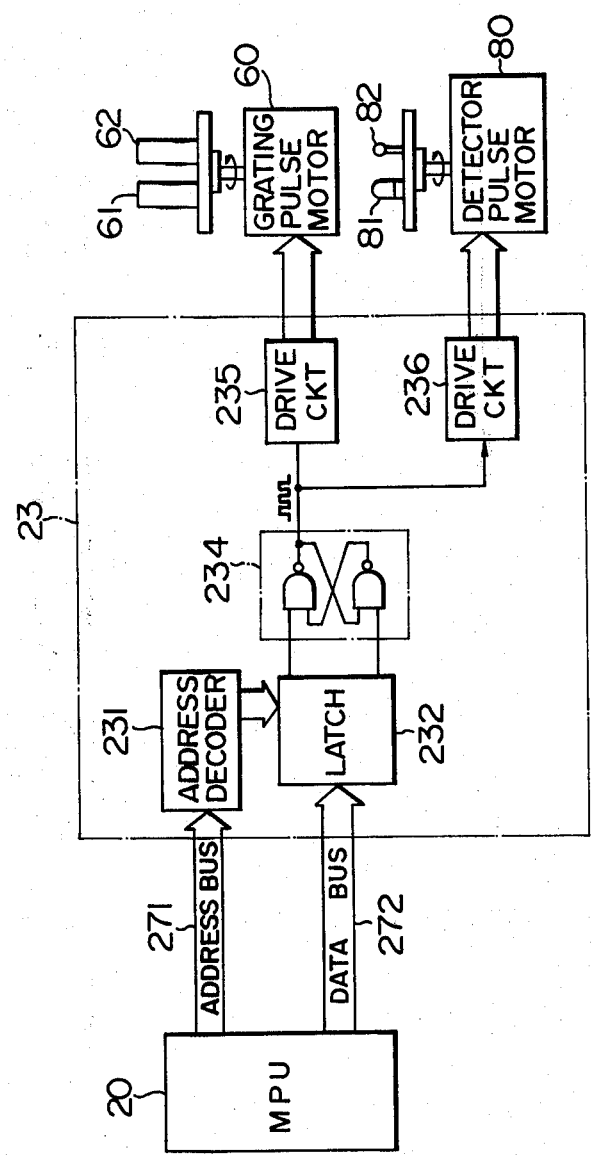
FIG. 2 is a block diagram for explaining the operation of a wavelength-range changeover mechanism which is applicable to the present invention.

Referring to FIG. 2, a wavelength-range changeover mechanism, which is applicable to the present invention, is made up of the MPU 20, an address bus 271, a data bus 272, the CONT CKT 23, the grating pulse motor 60, the gratings 61 and 62, the detector pulse motor 80, and the detectors 81 and 82. The ROM 21 and the RAM 22 are omitted in FIG. 2 for brevity's sake. Incidentally, like reference numerals in FIGS. 1 and 2 designate like parts or elements.

The control circuit (CONT CKT) 23, which is used to changeover the wavelength range, is made up of an address decoder 231, a latch circuit 232, a flip-flop circuit (F.F) 234, and drive circuits (DRIVE CKT) 235 and 236, and the grating pulse motor 60 and the detector pulse motor 80 are controlled by the drive circuits 235 and 236, respectively.

Next, explanation will be made on how the operational state of a 2-beam spectro-photometer is displayed in both calibration period and wavelength-range changeover period, by reference to the flow charts shown in FIGS. 3A, 3B, 3C and 4.

Figure 3A:
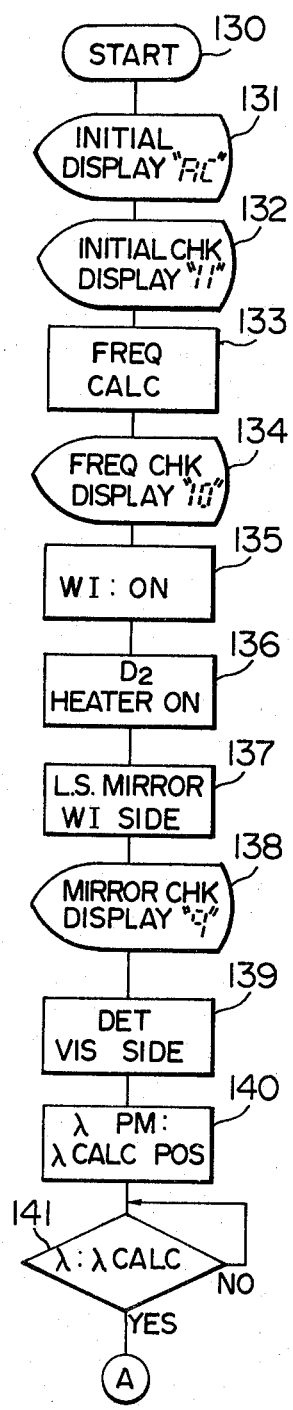
FIGS. 3A, 3B and 3C show flow charts for explaining the display operation according to the present invention in the calibration period.
Figure 3B:
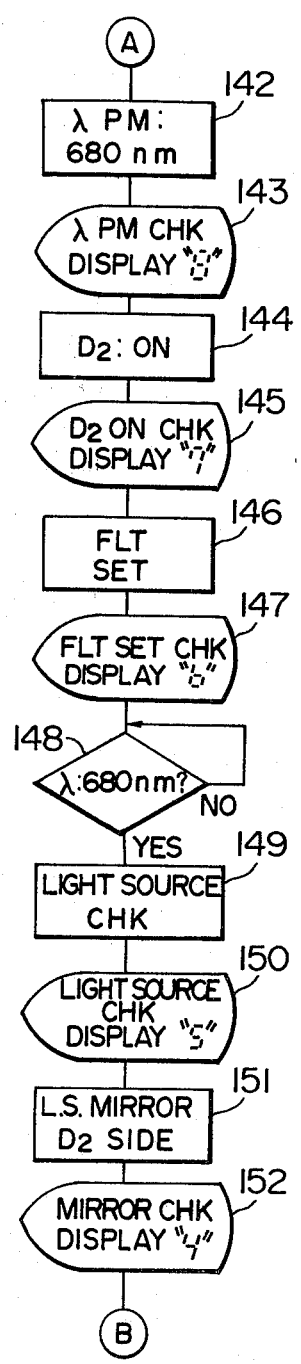
Figure 3C:
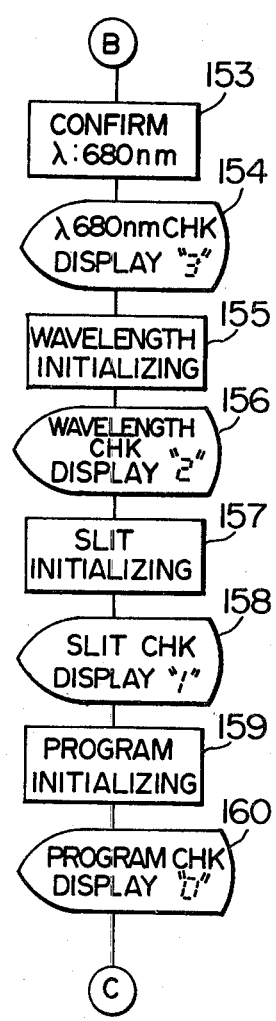

FIGS. 3A, 3B and 3C show flow charts for explaining the display operation according to the present invention in the calibration period.

In general, a spectro-photometer having the MPU 20 incorporated therein is possessed of such self-checking functions as the turning-on of the light source, the calibration of wavelength and the calibration of slit width.

According to the present invention, the contents displayed by the display element 13 on the operation panel 300 is changed in accordance with checked items. That is, the display element 13 displays the last item which has been appropriately checked. Further, the display element 12 on the operation panel 300 displays the number of items to be checked, namely, the number of remaining items, to clearly show the operational state of the spectro-photometer.

When the power supply is turned on, the calibration program is started, that is, the operation of the MPU 20 is started (step 130). In step 131, all clear operation is conducted in both the resettable memory of the RAM 13 and the resettable register of the MPU 20 clear, and a code "AC" indicating the all clear operation is displayed on the display element 13. In step 132, numeral "11" indicating the number of remaining check items is displayed on the display element 12, in order to show that the first step is now being conducted in the spectro-photometer.

In step 133, the frequency of supply voltage is checked. In more detail, it is judged whether the frequency of supply voltage is equal to 50 Hz or 60 Hz, by comparing the output signal of the frequency detector 400 with the speed of revolution of the sector motor 70. In either case, the arithmetic and control operation in the microcomputer 200 can be performed on the basis of a command from the MPU 20 corresponding to the identified frequency. Thus, the tap changing operation can be dispensed with. In other words, the frequency calculation is effected in step 133.

When the check in step 133 has been completed, numeral "10" is displayed on the display element 12 to show that the frequency check is completed and therefore the number of remaining check items is equal to ten (step 134).

In steps 135 and 136, the tungsten filament lamp WI and the heater of deuterium discharge tube $D_2$ are turned on.

In step 137, the light source mirror 42 is turned to the side of the tungsten filament lamp in accordance with a command from the MPU 20. In step 138, the MPU 20 displays numeral "9" on the display element 12, in order to show that the changeover of the mirror 42 is completed and the number of remaining check items is equal to nine.

In step 139, the detector mirror 84 is turned to the side corresponding to the visible wavelength range, namely, the side of the photomultiplier 81, in accordance with a command from the MPU 20.

In step 140, the sine bar type grating 61 is driven by the wavelength scan motor ($\lambda$ PM) 65 on the basis of a command from the MPU 20, to be placed at a position for coarse adjustment, which corresponds to a wavelength of about 920 nm lying on the long wavelength side of the visible range.

In step 141, the position for coarse adjustment is detected by a micro-switch mounted on the shaft of the sine bar type grating 61.

In step 142, the control circuit (CONT CKT) 23 operates the wavelength scan motor ($\lambda$ PM) 65 so as to drive the grating 61 toward a position corresponding to a wavelength of 680 nm. This operation places the grating 61 in the vicinity of a wavelength calibrating position corresponding to a wavelength of 656.1 nm.

In step 143, numeral "8" is displayed on the display element 12 to show that the grating 61 is moved to the position corresponding to a wavelength of 680 nm and the number of remaining check items is equal to eight.

In step 144, a voltage is applied between the gate and the cathode of the deuterium discharge tube $D_2$ to turn the discharge tube on. In step 145, numeral "7" is displayed on the display element 12 to show that the discharge tube $D_2$ is turned on in accordance with a command from the MPU 20 and the number of remaining check items is equal to seven.

In step 146, the control circuit 23 drives the filter switching motor 51 in accordance with a command from the MPU so as to set the filter at a reference position. In step 147, numeral "6" is displayed on the display element 12 to show that the filter 50 is set at the reference position and the number of remaining check items is equal to six.

In step 148, it is checked whether the grating 11 is placed at the position corresponding to a wavelength of 680 nm or not.

In step 149, it is judged by the MPU 20 whether the light source 40 or 41 is actually turned on or not, on the basis of the level of the signal which is supplied from the AMP 83 to the microcomputer 200. When it is judged that light source is not turned on, a code "E" is displayed on the display element 12 to show that an erroneous operation is performed.

In step 150, a numeral "5" is displayed on the display element 12 to show that the number of remaining check items is equal to five, when the light source is normally turned on and the photomultiplier 81 operates properly.

In step 151, the light source mirror 42 is turned to the side of the deuterium discharge tube $D_2$. In step 152, numeral "4" is displayed on the display element 12 to show that the light source mirror 42 has been turned to the side of the discharge tube $D_2$ and the number of remaining check items is equal to four.

In step 153, it is confirmed by the MPU 20 that the grating 61 is placed at the position corresponding to a wavelength of 680 nm. In step 154, numeral "3" is displayed to show that the confirmation in step 153 has been done and the number or remaining check items is equal to three.

In step 155, the MPU 20 drives the wavelength scan motor 65 through the CONT CKT 23 so as to continuously move the sine bar type grating 61 from the position corresponding to a wavelength of 680 nm toward the position corresponding to a wavelength of 651.6 nm, which is a peak wavelength in the line spectrum of the deuterium discharge tube $D_2$. The position corresponding to the peak wavelength, which is detected by the photomultiplier 81, is stored as the reference position in the RAM 22, in order to obtain positions corresponding to various wavelengths on the basis of the above reference position.

In step 156, numeral "2" is displayed on the display element 12 to show that the check of wavelength has been completed in step 155 and the number of remaining check items is equal to two.

After the position corresponding to the peak wavelength of the discharge tube $D_2$ 41 has been defined in step 155, step 157 is carried out, that is, the MPU 20 drives the wavelength scan motor 65 through the CONT CKT 23 so as to continuously move the grating 61 from the position corresponding to the peak wavelength to a position corresponding to the half width of the peak wavelength, which is detected by the photomultiplier 81. The number of pulses which are supplied to the wavelength scan motor 65 to cause the grating 61 to effect the above movement, is stored in the RAM 22. The width of the slit 63 is kept constant during the above movement. Since one-to-one correspondence exists between the width of the slit 63 and the number of pulses applied to the wavelength scan motor 65 to move the grating 61 from the position corresponding to the peak wavelength of the discharge tube $D_2$ to the position corresponding to the half-width of the peak wavelength, the slit width used is determined from the above number of pulses. Further, since the width of the slit 63 is proportional to the number of pulses applied to the motor 65, the slit width can be calibrated on the basis of the number of pulses which has been stored in the RAM 22.

In step 158, numeral "1" is displayed on the display element 12 to show that the width of the slit 63 has been checked and the number of remaining check items is equal to one.

In step 159, the program initializing processing is carried out, and initial values of various parameters are set.

In step 160, numeral "0" is displayed on the display element 12 to show that the self-checking operation and the initialization have been completed.

As is apparent from the flow chart shown in FIGS. 3A, 3B and 3C, according to the present invention, the number of remaining steps is successively displayed in a period from the time when the power supply is turned on, to the time when the spectro-photometer is ready to make measurements. Accordingly, it is possible to know whether the check is normally conducted or not. Further, the waiting time till the initialization is complete can be readily known from the number of remaining steps.

A 7-segment display element, a dto-type display element, a display element using Braun tube, or the like can be used as the display elements 12 and 13.

Prior to measurements by the spectro-photometer, the zero point adjustment and the full scale adjustment have to be conducted in the recorder 500. The zero point adjustment is conducted as follows: the knob 18 on the operation panel 300 is turned so as to make the index of the recorder 500 coincident with zero mark when the optical path passing through the sample cell 73 is closed. While, the full scale adjustment is conducted as follows: the knob 17 of the recorder 500 is turned so that the index of the recorder 500 indicates full scale when the reference cell 72 and the sample cell 73 are both taken out of the optical paths.

Figure 4:
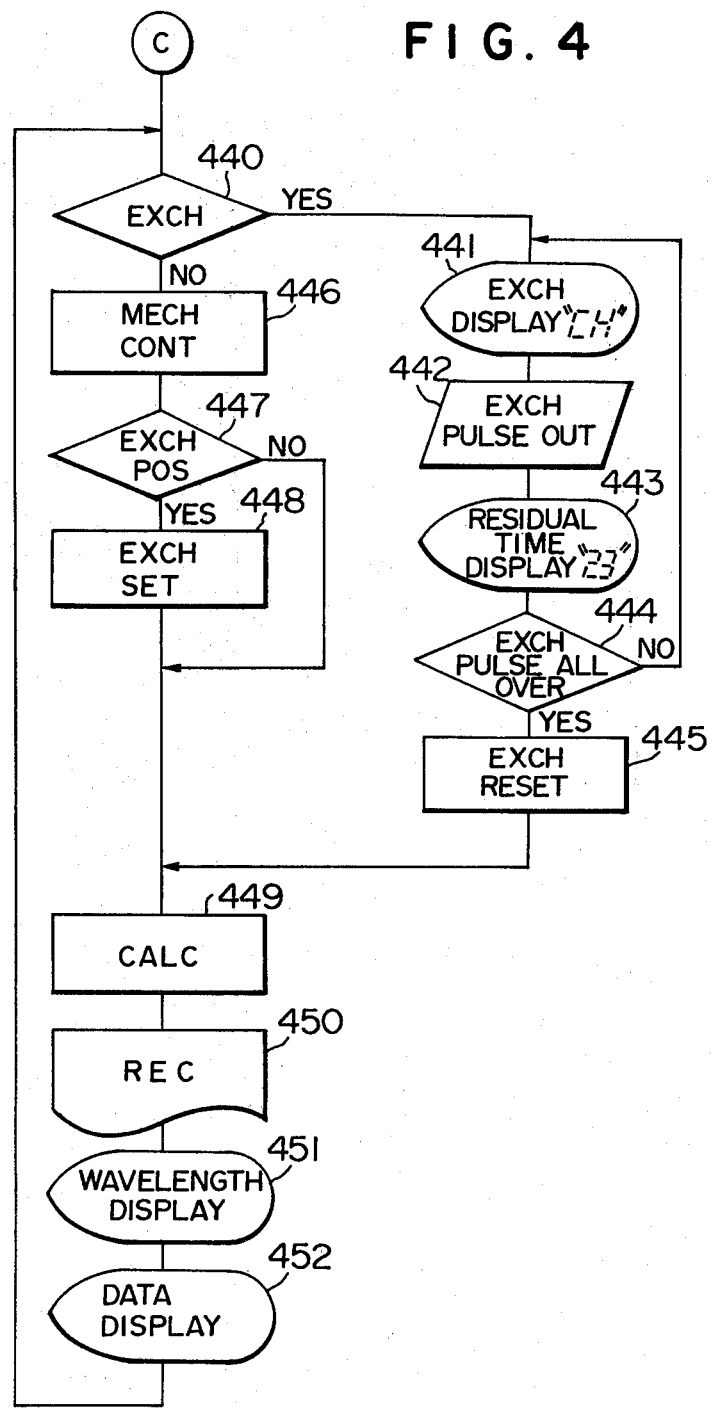
FIG. 4 shows a flow chart for explaining the display operation according to the present invention in the wavelength-range changeover period.

FIG. 4 shows a flow chart for explaining the display operation according to the present invention in the wavelength-range changeover period.

In step 440, it is judged whether the changeover of the wavelength range is necessary or not. When the above changeover is necessary, a changeover routine is read out of the ROM 21 and the following steps are carried out.

In step 441, a code "CH" is displayed on the display element 13 in accordance with a command from the MPU 20, to show that the wavelength range is being changed over.

In step 442, the MPU 20 sends an output signal to the CONT CKT 23 through the data bus to drive the drive circuits 235 and 236. The output of the drive circuit 235 drives the grating pulse motor 60 so as to change the grating 61 over to the grating 62. While, the output of the drive circuit 236 drives the detector pulse motor so as to change the photomultiplier 81 over to the PbS detector 82. The address signal supplied from the MPU 20 to the address bus 271 is sent to the latch circuit 232 through the address decoder 231. Thus, the output signal from the MPU 20 is set in the latch circuit 232, and then converted by the flip-flop circuit 234 into pulses, which are sent through the drive circuits 235 and 236 to the pulse motors 60 and 80 one by one.

In step 443, the MPU 20 calculates a residual time from the number of pulses which must be sent to the pulse motors 60 and 80 to complete the changeover operation; and a numeral indicating the residual time is displayed on the display elements 12.

In step 444, it is judged whether all of the pulses required to finish the changeover operation are sent out or not. When all of the pulses are not sent out, steps 441 to 444 are again carried out. Thus, the residual time is calculated and displayed on the display element 12 during the time pulses are sent to the pulse motors 60 and 80. When all of the pulses are sent out, the spectro-photometer is reset by the wavelength-range changeover routine in accordance with a command from the MPU 20 (step 445).

When it is judged in step 440 that the changeover of the wavelength range is not necessary, step 446 is carried out.

In step 446, various mechanical controls such as the control of the wavelength scan motor 65 or the slit drive motor 66 are conducted in accordance with a command from the operation panel 300.

In step 447, it is judged whether the spectro-photometer is placed in such a state as requiring the changeover of the wavelength range or not. When the changeover of the wavelength range is unnecessary, step 449 is carried out. When the above changeover is necessary, the spectro-photometer is set to the wavelength-range changeover side (step 448).

In step 449, the differential spectrum and the optical density are calculated on the basis of photometric values in accordance with a command from the MPU 20.

In step 450, the values obtained from the calculation in step 449 are recorded on the recorder 500 in accordance with a command from the MPU 20.

In step 451, the measuring wavelength is displayed on the display element 13. In step 452, the values obtained from the calculation in step 449 are displayed on the display element 12.

When the operation in step 452 has been completed, step 440 is again carried out.

As is apparent from the flow chart shown in FIG. 4, according to the present invention, it can be known from the code displayed on the display element 13 that the changeover of wavelength range is now conducted. Further, the time required to finish the changeover operation can be known from the numerals displayed on the display element 12. Furthermore, since the contents displayed on the display elements 12 and 13 are varied with time, it is clearly known that the spectro-photometer is not subjected to any trouble but operates normally.

As has been described hereinbefore, according to the present invention, the reliability of the spectro-photometer is greatly enhanced.

What is claimed is:

1. A spectro-photometer having an arithmetic and control unit comprising a spectro-photometer including a calibration mechanism and a wavelength-range changeover mechanism; operation setting means for presetting measuring conditions of said spectro-photometer; storage means for storing therein calibration signals in the order of calibration to be performed by said calibration mechanism, changeover signals in the order of changeover to be performed by said wavelength-range changeover mechanism, and the input information from said operation setting means; an arithmetic unit for generating control signals required to automatically control said calibration mechanism and said wavelength-range changeover mechanism on the basis of said calibration signals, said changeover signals and said input information, all of which are stored in said storage means, and for performing an arithmetic processing an measured values obtained by said spectro-photometer; and a control unit for controlling said calibration mechanism and said wavelength-range changeover mechanism in response to said control signals from said arithmetic unit, further comprising:

first display means for displaying an indication that said spectro-photometer is subjected to calibration or changeover of the wavelength range, in accordance with a command from said arithmetic unit, when said input information read out of said storage means by said arithmetic unit shows that said spectro-photometer is being automatically subjected to said calibration or said changeover of wavelength range; and second display means for displaying indications of the states of the steps in said calibration or wavelength-range changeover operations required to be carried out till the termination of operation in said calibration mechanism or said wavelength-range changeover mechanism, in accordance with an output from said arithmetic unit.

2. A spectro-photometer according to claim 1, wherein said first display means includes means to display photometric values calculated by said arithmetic unit based on said measured values obtained by said spectro-photometer and said second display means includes means to display a measuring wavelength used during the photometric period other than the calibration period and the wavelength-range changeover period.

3. A spectro-photometer according to claim 1, wherein said first display means includes means to display an indication in the form of a code that said spectro-photometer is subjected to the calibration operation or the changeover of wavelength range operation.

4. A spectro-photometer according to claim 1, wherein said second display means includes means to display an indication of the waiting time till the termination of the wavelength-range changeover operation performed by said wavelength-range changeover mechanism, in accordance with an output from said arithmetic unit.

5. A spectro-photometer according to claim 1, wherein said second display means includes means to display an indication of the number of check steps which must be carried out before the termination of the calibration operation performed by said calibration mechanism, in accordance with an output from said arithmetic unit.

6. A spectro-photometer according to claim 1, wherein said second display means includes means to display an indication in the form of a code that the light source of said spectro-photometer is turned off, in accordance with an output from said arithmetic unit, in a case wherein said light source is turned off during the calibration period.

7. In a spectro-photometer having an arithmetic and control unit and including a calibration mechanism and a wavelength-range changeover mechanism; operation setting means for presetting measuring conditions of said spectro-photometer; storage means for storing therein calibration signals in the order of calibration to be performed by said calibration mechanism, changeover signals in the order of changeover to be performed by said wavelength-range changeover mechanism, and the input information from said operation setting means; and arithmetic unit for generating control signals required to automatically control said calibration mechanism and said wavelength-range changeover mechanism on the basis of said calibration signals, said changeover signals and said input information, all of which are stored in said storage means, and for performing an arithmetic processing on measured values obtained by said spectro-photometer; and a control unit for controlling said calibration mechanism and said wavelength-range changeover mechanism in response to said control signals from said arithmetic unit, a method of indicating the progress of operations of said spectro-photometer comprising:

a first step of displaying an indication that said spectro-photometer is subjected to calibration or changeover of the wavelength range, in accordance with a command from said arithmetic unit, when said input information read out of said storage means by said arithmetic unit shows that said spectro-photometer is being automatically subjected to said calibration or said changeover of wavelength range; and a second step of displaying indications of the states of the steps in said calibration or wavelength-range changeover operations required to be carried out till the termination of operation in said calibration mechanism or said wavelength-range changeover mechanism, in accordance with an output from said arithmetic unit.

8. A method according to claim 7, wherein said first step includes displaying photometric values calculated by said arithmetic unit based on said measured values obtained by said spectro-photometer and said second step includes displaying a measuring wavelength used during the photometric period other than the calibration period and the wavelength-range changeover period.

9. A method according to claim 7, wherein said first step includes displaying an indication in the form of a code that sad spectro-photometer is subjected to the calibration operation or the changeover of wavelength-range operation.

10. A method according to claim 7, wherein said second step includes displaying an indication of the waiting time till the termination of the wavelength-range changeover operation performed by said wavelength-range changeover mechanism in accordance with an output from said arithmetic unit.

11. A method according to claim 7, wherein said second step includes displaying an indication of the number of check steps which must be carried out before the termination of the calibration operation performed by said calibration mechanism in accordance with an output from said arithmetic unit.

12. A spectro-photometer according to claim 7, wherein said second step includes displaying an indication in the form of a code that the light source of said spectro-photometer is turned off in accordance with an output from said arithmetic unit, in a case where said light source is turned off during the calibration period.

* * * * *